US011170209B1

United States Patent
Ma et al.

(10) Patent No.: US 11,170,209 B1
(45) Date of Patent: Nov. 9, 2021

(54) SYSTEMS AND METHODS FOR FISH VOLUME ESTIMATION, WEIGHT ESTIMATION, AND ANALYTIC VALUE GENERATION

(71) Applicant: InnovaSea Systems, Inc., Boston, MA (US)

(72) Inventors: Chen Ma, Redmond, WA (US); Srikanth Parupati, Malden, MA (US); Raghunandan Pasula, Cranston, RI (US)

(73) Assignee: Innovasea Systems, Inc., Boston, MA (US)

( * ) Notice: Subject to any disclaimer, the term of this patent is extended or adjusted under 35 U.S.C. 154(b) by 0 days.

(21) Appl. No.: 16/854,682

(22) Filed: Apr. 21, 2020

(51) Int. Cl.
| | |
|---|---|
| *A01K 29/00* | (2006.01) |
| *A01K 61/10* | (2017.01) |
| *G06K 9/00* | (2006.01) |
| *G06T 5/00* | (2006.01) |
| *G06T 7/00* | (2017.01) |
| *G06T 7/10* | (2017.01) |
| *G06T 7/55* | (2017.01) |

(Continued)

(52) U.S. Cl.
CPC ........ *G06K 9/00342* (2013.01); *A01K 29/005* (2013.01); *A01K 61/10* (2017.01); *G06K 9/00369* (2013.01); *G06T 5/006* (2013.01); *G06T 7/0012* (2013.01); *G06T 7/10* (2017.01); *G06T 7/55* (2017.01); *G06T 7/62* (2017.01); *H04N 5/23212* (2013.01); *H04N 13/296* (2018.05); *G06T 2207/10012* (2013.01)

(58) Field of Classification Search
USPC .......................................................... 348/46
See application file for complete search history.

(56) References Cited

U.S. PATENT DOCUMENTS

| | | | |
|---|---|---|---|
| 2013/0223693 A1* | 8/2013 | Chamberlain | ........ G06T 7/0004 382/110 |
| 2019/0228218 A1* | 7/2019 | James | ..................... G06T 7/593 |

FOREIGN PATENT DOCUMENTS

WO     2019232247 A1     12/2019

OTHER PUBLICATIONS

Konovalov, D.A., et al., "Automatic Weight Estimation of Harvested Fish from Images," IEEE. Published in the Digital Image Computing: Techniques and Applications, Sep. 6, 2019, 7 pages.

(Continued)

*Primary Examiner* — Patricia I Young
(74) *Attorney, Agent, or Firm* — Pierce Atwood LLP; Kevin M. Farrell; Christopher A. Baxter

(57) ABSTRACT

An underwater camera system for monitoring fish in a fish pen is described. A stereoscopic camera may be used to determine dimensions of fish, and the underwater camera system may use the fish dimensions to estimate a biomass value of fish within the fish pen. The biomass value and rates of change of the biomass value may be used to adjust feeding of the fish in the fish pen. Images captured by the stereoscopic camera may be used to focus a variable focal lens camera on a fish to obtain high-resolution images that can be used for diagnosing fish conditions. Images captured by the stereoscopic camera may be used to predict motion of the fish, and the predicted motion may be used to generate various fish monitoring analytic values. The fish monitoring analytic values may be used to automatically control operation of the fish pen.

14 Claims, 9 Drawing Sheets

(51) Int. Cl.
*G06T 7/62* (2017.01)
*H04N 13/296* (2018.01)
*H04N 5/232* (2006.01)

(56) References Cited

OTHER PUBLICATIONS

Rodriquez, A., et al., "Fish monitoring and sizing using computer vision," International Work-Conference on the Interplay Between Natural and Artificial Computation, 2015, pp. 1-10.
PCT Search Report and Written Opinion of WO2019/232247 for corresponding International Patent Application No. PCT/US21/27392 dated Sep. 15, 2021; 19 pages.

* cited by examiner

SYSTEMS AND METHODS FOR FISH VOLUME ESTIMATION, WEIGHT ESTIMATION, AND ANALYTIC VALUE GENERATION

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a computer-implemented method of determining biomass of at least one fish in a fish pen is provided. A computing device detects a location of a fish in an image captured by an underwater stereoscopic camera. The computing device determines a segmentation mask for the fish in the image. The computing device determines whether the segmentation mask is associated with a measurable fish. In response to determining that the segmentation mask is associated with a measurable fish, the computing device determines at least one dimension of the fish based on the image, determines a weight of the fish based on the at least one dimension of the fish, and adds the weight of the fish to a set of fish weight measurements.

In some embodiments, an underwater camera system for monitoring a plurality of fish in a fish pen is provided. The system comprises at least one camera and a computing device communicatively coupled to the at least one camera. The computing device is configured to detect a fish in at least one image from the at least one camera; determine a motion behavior of the fish from the at least one image; and determine at least one fish monitoring analytic value based at least in part on the motion behavior of the fish.

In some embodiments, a non-transitory computer-readable medium having computer-executable instructions stored thereon is provided. The instructions, in response to execution by one or more processors of a computing device, cause the computing device to perform actions for monitoring a plurality of fish in a fish pen, the actions comprising receiving, by the computing device, an image captured by an underwater camera system that depicts at least one fish; determining, by the computing device, a measurability of at least one fish in the image based at least in part on whether the at least one fish is occluded; and in response to determining that at least one fish in the image is measurable, determining at least one characteristic of the at least one fish based on the image.

In some embodiments, an underwater camera system for monitoring at least one fish in a fish pen is provided. The system comprises a stereoscopic camera, a variable focal lens camera, and a computing device. The computing device is communicatively coupled to the variable focal lens camera and the stereoscopic camera. The computing device is configured to detect a fish in an image from the stereoscopic camera; adjust a focus of the variable focal lens camera based on the image from the stereoscopic camera; capture a focused image of the fish using the variable focal lens camera; and determine at least one fish monitoring analytic value based at least in part on the focused image.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Aquaculture techniques such as fish farming are becoming more prevalent as a way to cultivate fish for consumption. One relatively new form of aquaculture uses a fish pen deployed in open water. While such systems provide a beneficial environment for cultivating fish, the underwater deployment of the fish pen makes it difficult to monitor conditions and fish health within the pen. In order to efficiently manage operation of the fish pen, it is desired to have accurate and timely monitoring of the fish within the fish pen. Weight and health are two conditions for which accurate monitoring is desired: monitoring changes in biomass within the fish pen can inform decisions regarding whether to increase or reduce supporting feeding systems, and monitoring health of fish within the fish pen can inform decisions regarding whether to provide treatments for any conditions afflicting the fish.

Figure 1:
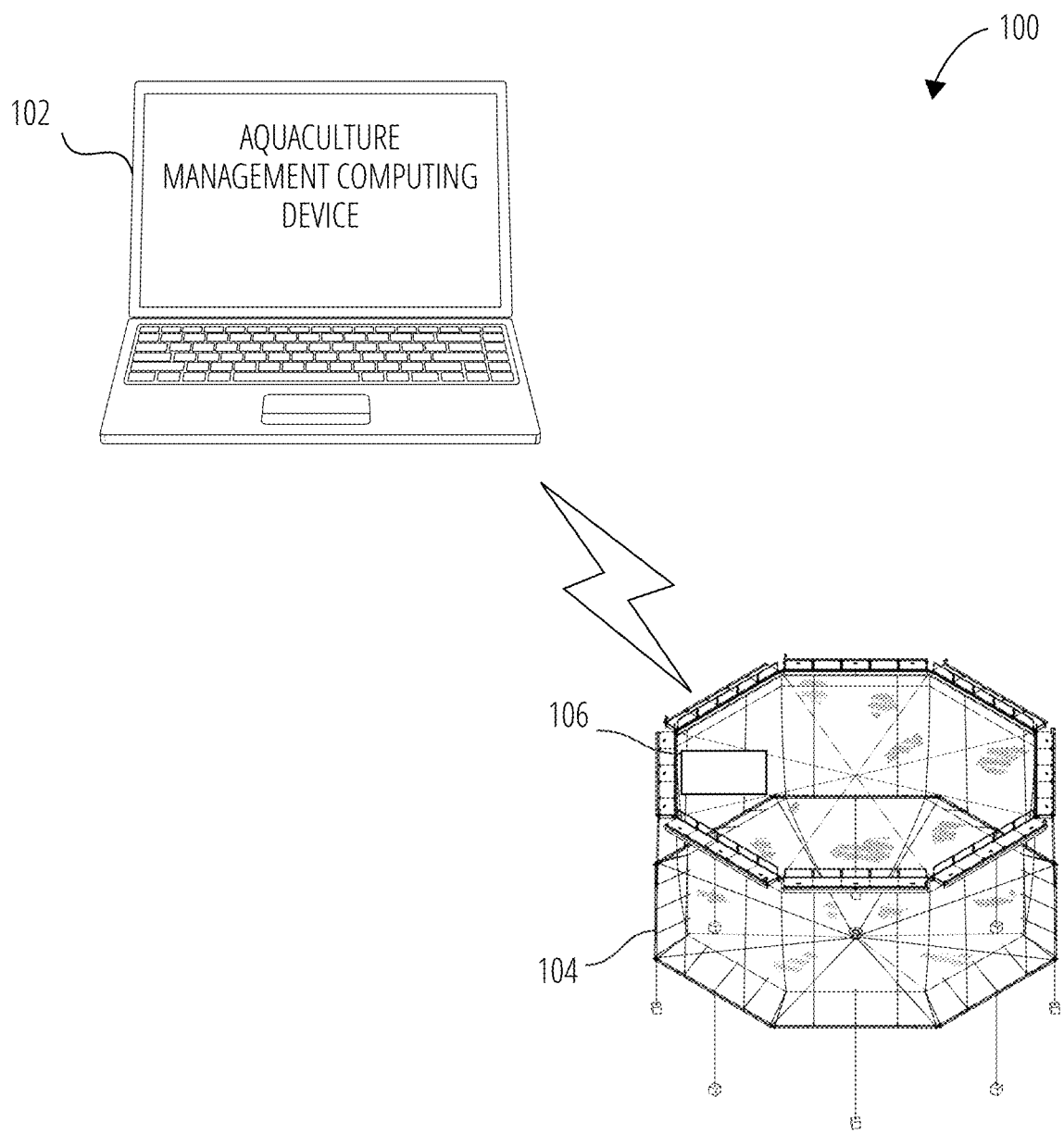
FIG. 1 is a schematic drawing that illustrates a non-limiting example embodiment of a system for monitoring and controlling conditions within a fish pen according to various aspects of the present disclosure.

FIG. 1 is a schematic drawing that illustrates a non-limiting example embodiment of a system for monitoring and controlling conditions within a fish pen according to various aspects of the present disclosure.

In the illustrated system 100, an aquaculture management computing device 102 is communicatively coupled to an underwater camera system 106 that is installed with a fish pen 104. In some embodiments, the underwater camera system 106 is configured to capture and analyze images of fish within the fish pen 104 to determine at least one of health information and biomass estimates for the fish.

In some embodiments, the underwater camera system 106 transmits the at least one of the health information and the biomass estimates to the aquaculture management computing device 102. In some embodiments, the aquaculture management computing device 102 may present the received information to a user so that the user can take actions to manage the fish pen 104, including but not limiting to changing a rate of feeding and providing treatment for adverse health conditions. In some embodiments, the aquaculture management computing device 102 may receive the information and autonomously take management actions with or without presenting the information to a user, including but not limited to automatically changing a rate of feeding by an automated feed pellet dispenser, automatically changing a depth of the fish pen 104, and automatically dispensing a medication.

Though the aquaculture management computing device 102 is illustrated in FIG. 1 as being a laptop computing device, in some embodiments, other types of computing devices may be used for the aquaculture management computing device 102, including but not limited to a desktop computing device, a server computing device, a tablet computing device, a smartphone computing device, and one or more computing devices in a cloud computing system.

Further, FIG. 1 illustrates an example embodiment wherein the underwater camera system 106 is installed with a fish pen 104 that is an underwater fish pen that may be submerged in open water, such as in the open ocean. However, this embodiment should not be seen as limiting, and in some embodiments, the underwater camera system 106 may be installed underwater in different environments. For example, in some embodiments, the underwater camera system 106 may be installed in a surface fish pen at an aquaculture site near a coastline. As another example, in some embodiments, the underwater camera system 106 may be utilized underwater in a fish pen associated with a land-based hatchery or nursery in order to monitor fish larvae, hatchlings, and/or juveniles. As yet another example, in some embodiments, the underwater camera system 106 may be utilized in a fish pen associated with a recirculating aquaculture system (RAS), in which a land-based fish pen coupled to sophisticated water processing systems is used to grow fish.

Figure 2:
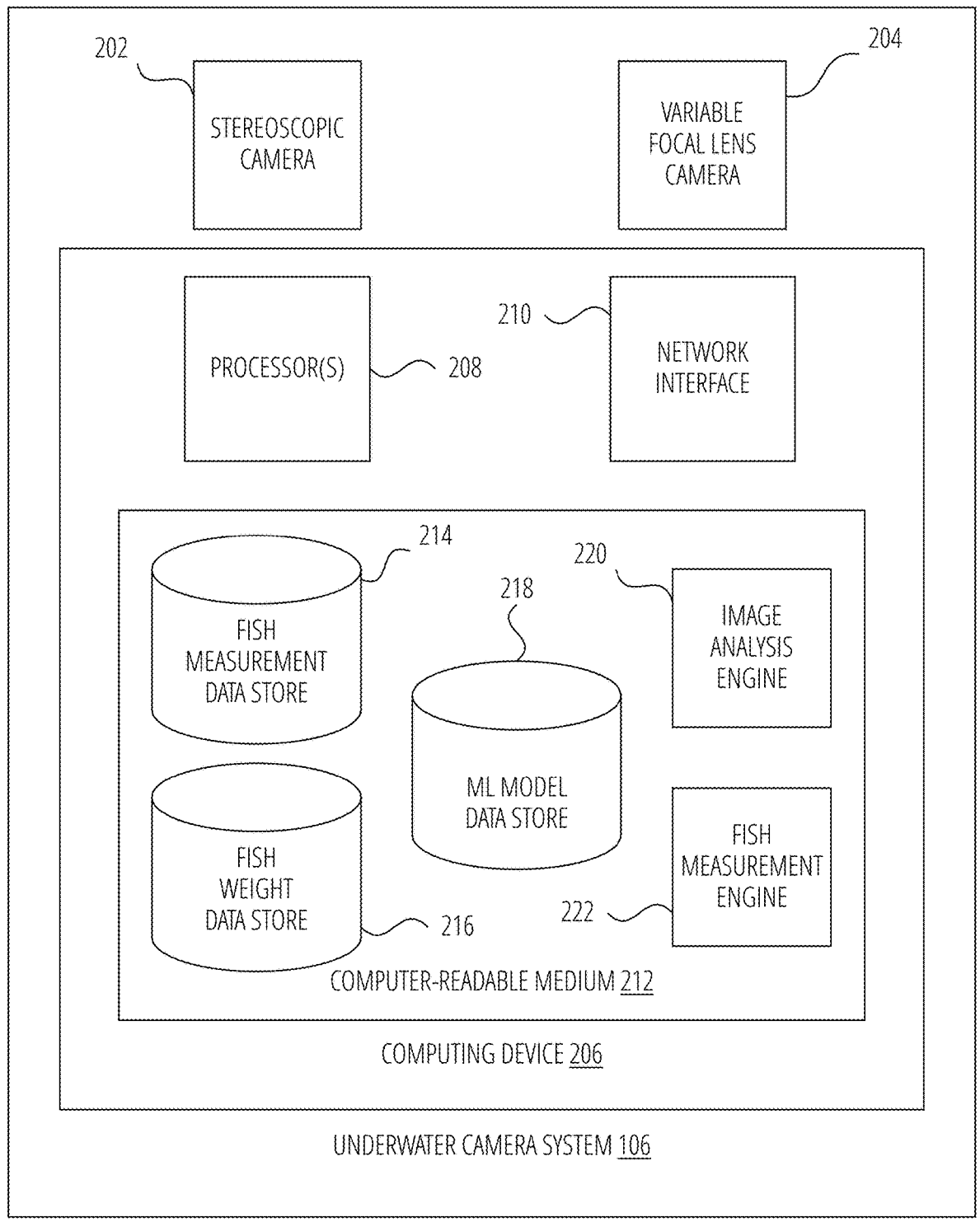
FIG. 2 is a block diagram that illustrates a non-limiting example embodiment of an underwater camera system according to various aspects of the present disclosure.

FIG. 2 is a block diagram that illustrates a non-limiting example embodiment of an underwater camera system according to various aspects of the present disclosure. The underwater camera system 106 is designed to provide a high-accuracy system for monitoring fish in a fish pen to determine characteristics such as health and total biomass.

As shown, the underwater camera system 106 includes a stereoscopic camera 202, a variable focal lens camera 204, and a computing device 206. In some embodiments, a housing (not pictured) may enclose the components of the underwater camera system 106, or may enclose some components of the underwater camera system 106 and provide external mounting locations for other components of the underwater camera system 106.

In some embodiments, the stereoscopic camera 202 is a camera that includes two cameras that are physically offset from each other so that parallax can be used to determine depth information for pixels in an image. In some embodiments, a camera that uses other depth-detection techniques, including but not limited to a time-of-flight sensor, may be used instead of a stereoscopic camera 202. In some embodiments, the variable focal lens camera 204 is a camera that can take high-resolution pictures over a limited focal depth. Because the focal depth is limited, the variable focal lens camera 204 has a mechanism to adjust the distance of the focal point from the variable focal lens camera 204. In general, any suitable stereoscopic camera 202 and variable focal lens camera 204 adapted for use underwater may be used. In some embodiments, only one or the other of the stereoscopic camera 202 and the variable focal lens camera 204 may be present. In some embodiments, the underwater camera system 106 may include a wide field of view camera instead of or in addition to the stereoscopic camera 202.

As shown, the computing device 206 includes one or more processor(s) 208, a network interface 210, and a computer-readable medium 212. In some embodiments, the processor(s) 208 may include one or more commercially available general-purpose computer processors, each of which may include one or more processing cores. In some embodiments, the processor(s) 208 may also include one or more special-purpose computer processors, including but not limited to one or more processors adapted for efficiently performing machine learning tasks and/or one or more processors adapted for efficiently performing computer vision tasks, including but not limited to a Compute Unified Device Architecture (CUDA)-enabled graphics processing unit (GPU).

In some embodiments, the network interface 210 may implement any suitable communication technology to communicate information from the underwater camera system 106 to another computing device. For example, in some embodiments, the network interface 210 may include a wireless interface that implements a 2G, 3G, 4G, 5G, LTE, Wi-Fi, WiMAX, Bluetooth, satellite-based, or other wireless communication technology. As another example, in some embodiments, the network interface 210 may include a wired interface that implements an Ethernet, USB, Firewire, CAN-BUS, or other wired communication technology. In some embodiments, the network interface 210 may include multiple communication technologies. For example, the network interface 210 may include a wired interface that couples the underwater computing device 206 to a transceiver located on a buoy or other component at the surface, and the transceiver may use a wireless communication technology to communicate with a computing device on a ship or on shore. In some embodiments, the underwater camera system 106 may transfer data via the exchange of a removable computer-readable medium, including but not limited to a flash memory or a hard drive.

In some embodiments, the computer-readable medium 212 is installed in the computing device 206 and stores computer-executable instructions that, in response to execution by the processor(s) 208, cause the underwater camera system 106 to provide various engines and/or data stores. In some embodiments, the computer-readable medium 212 may include a magnetic computer-readable medium including but not limited to a hard disk drive. In some embodiments, the computer-readable medium 212 may include an optical computer-readable medium including but not limited to a DVD or CD-ROM drive. In some embodiments, the computer-readable medium 212 may include an electronic non-volatile storage medium including but not limited to flash memory. In some embodiments, at least some of the computer-executable instructions may be programmed into a field-programmable gate array (FPGA), an application-specific integrated circuit (ASIC), or other device that combines storage of computer-executable instructions with one or more circuits for implementing logic. In some embodiments, such an FPGA or ASIC may provide aspects of both the computer-readable medium 212 and the computing device 206. In some embodiments, combinations of the above-described computer-readable media may be provided to collectively provide the illustrated computer-readable medium 212.

As shown, the computer-readable medium 212 includes an image analysis engine 220, a fish measurement engine 222, a fish measurement data store 214, a fish weight data store 216, and a machine learning model data store 218. In some embodiments, the image analysis engine 220 receives and processes information from the stereoscopic camera 202 and/or the variable focal lens camera 204 to capture images of fish in the fish pen 104 for analysis. In some embodiments, the image analysis engine 220 also conducts pre-processing, filtering, and/or other analysis of the images. In some embodiments, the image analysis engine 220 may transmit control commands to the stereoscopic camera 202 and/or the variable focal lens camera 204. In some embodiments, the fish measurement engine 222 receives images that have been processed by the image analysis engine 220, and generates measurements of fish within the images. Further description of actions performed by the image analysis engine 220 and fish measurement engine 222 is provided below.

In some embodiments, the fish measurement data store 214 stores measurements of fish generated by the fish measurement engine 222 and/or the image analysis engine 220. In some embodiments, the fish weight data store 216 stores correlations between characteristics of fish that are determinable by the image analysis engine 220, such as one or more dimensions of the fish, and a weight of the fish. In some embodiments, the machine learning model data store 218 stores one or more machine learning models that have been trained to perform various tasks on images. For example, the machine learning model data store 218 may store one or more convolutional neural networks that are trained to detect fish in an image. Further description of the information stored by and retrieved from the fish measurement data store 214, fish weight data store 216, and machine learning model data store 218 is provided below.

As used herein, "engine" refers to logic embodied in hardware or software instructions, which can be written in a programming language, such as C, C++, COBOL, JAVA™, PHP, Perl, HTML, CSS, JavaScript, VBScript, ASPX, Microsoft .NET™, Go, Python, and/or the like. An engine may be compiled into executable programs or written in interpreted programming languages. Software engines may be callable from other engines or from themselves. Generally, the engines described herein refer to logical modules that can be merged with other engines, or can be divided into sub-engines. The engines can be implemented by logic stored in any type of computer-readable medium or computer storage device and be stored on and executed by one or more general purpose computers, thus creating a special purpose computer configured to provide the engine or the functionality thereof. The engines can be implemented by logic programmed into an application-specific integrated circuit (ASIC), a field-programmable gate array (FPGA), or another hardware device.

The fish measurement data store 214, the fish weight data store 216, and the machine learning model data store 218 are illustrated as being present on the computer-readable medium 212. In some embodiments, one or more of the fish measurement data store 214, the fish weight data store 216, and the machine learning model data store 218 may be present on a different computer-readable medium or different computing device.

As used herein, "data store" refers to any suitable device configured to store data for access by a computing device. One example of a data store is a highly reliable, high-speed relational database management system (DBMS) executing on one or more computing devices and accessible over a high-speed network. Another example of a data store is a key-value store. However, any other suitable storage technique and/or device capable of quickly and reliably providing the stored data in response to queries may be used, and the computing device may be accessible locally instead of over a network, or may be provided as a cloud-based service. A data store may also include data stored in an organized manner on a computer-readable storage medium, such as a hard disk drive, a flash memory, RAM, ROM, or any other type of computer-readable storage medium. One of ordinary skill in the art will recognize that separate data stores described herein may be combined into a single data store, and/or a single data store described herein may be separated into multiple data stores, without departing from the scope of the present disclosure.

Figure 3:
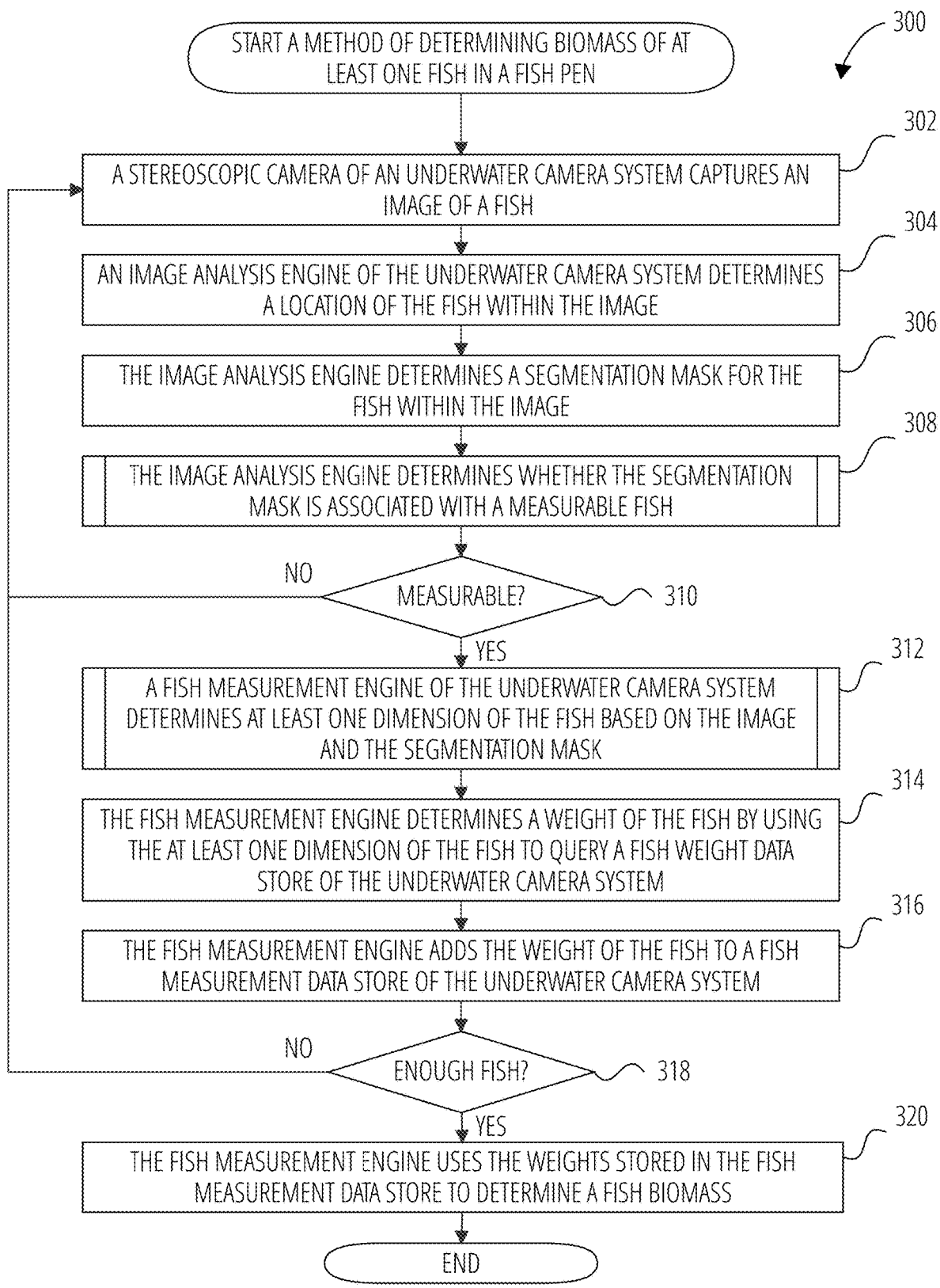
FIG. 3 is a flowchart that illustrates a non-limiting example embodiment of a method of determining total biomass of a plurality of fish in a fish pen according to various aspects of the present disclosure.

FIG. 3 is a flowchart that illustrates a non-limiting example embodiment of a method of determining biomass of at least one fish in a fish pen according to various aspects of the present disclosure. Measuring fish in a fish pen in an automated manner using camera imagery faces multiple difficulties. For example, degraded image quality due to focus/motion blur, occlusion of fish by other fish or hardware of the fish pen, poor illumination, or angled fish may cause bad monitoring data to be generated. In some embodiments, the method 300 attempts to avoid these issues by providing a quality-determination pipeline and unique measurement techniques in order to gather data from camera imagery that is accurate enough to produce reliable estimates of biomass in a fish pen. In some embodiments, measurements of a plurality of fish may be collected and used with an estimate of a population count of the fish the fish pen to determine a total biomass of fish within the fish pen.

From a start block, the method 300 proceeds to block 302, where a stereoscopic camera 202 of an underwater camera system 106 captures an image of a fish. In some embodiments, the image captured by the stereoscopic camera 202 may include more than one fish, and the method 300 may process multiple fish in a single image. However, for ease of discussion, the description of method 300 will assume that the image includes a single fish to be measured. The image captured by the stereoscopic camera 202 includes color information and depth information for each pixel within the image.

At block 304, an image analysis engine 220 of the underwater camera system 106 determines a location of the fish within the image. In some embodiments, the image analysis engine 220 may use a first machine learning model from the machine learning model data store 218 in order to determine a bounding box that defines the location of the fish within the image. In some embodiments, the first machine learning model used to determine the location of the fish within the image may be a convolutional neural network trained on other images of fish to detect fish in a stereoscopic image.

At block 306, the image analysis engine 220 determines a segmentation mask for the fish within the image. In some embodiments, the image analysis engine 220 may use a second machine learning model from the machine learning model data store 218 to determine the segmentation mask. For example, the image analysis engine 220 may crop out the portion of the image that includes the location of the fish that was determined at block 304, and may provide the cropped out portion as input to the second machine learning model. In some embodiments, the second machine learning model may be another convolutional neural network. In some embodiments, other techniques may be used to determine or refine the segmentation mask for the fish, including but not limited to edge detection and detection of depth discontinuities.

Figure 4:
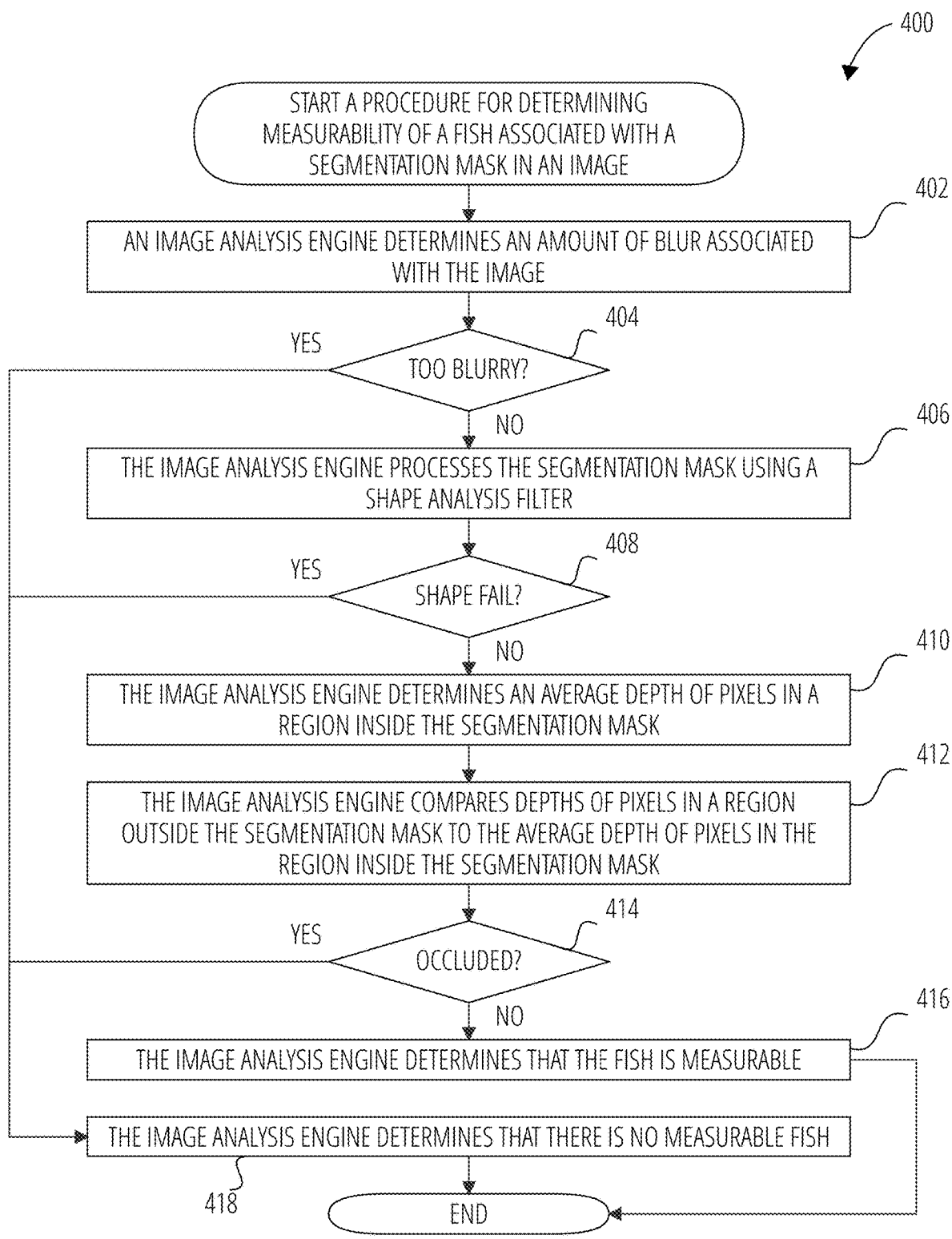
FIG. 4 is a flowchart that illustrates a non-limiting example embodiment of a procedure for determining measurability of a fish associated with a segmentation mask in an image according to various aspects of the present disclosure.

At procedure block 308, the image analysis engine 220 determines whether the segmentation mask is associated with a measurable fish. One of the problems with automated processing of images from underwater cameras is that many of the images captured by the underwater cameras may be unsuitable for automated analysis. Accordingly, the method 300 may use any suitable procedure at procedure block 308 to determine whether the image is suitable for measuring the fish associated with the segmentation mask. One non-limiting example of such a procedure is illustrated in FIG. 4 and described in detail below.

The method 300 then proceeds to decision block 310, where a decision is made based on whether or not the fish was determined to be measurable. If the fish was not determined to be measurable, then the result of decision block 310 is NO, and the method 300 returns to block 302 to capture another image of a fish. Otherwise, if the fish was determined to be measurable, then the result of decision block 310 is YES, and the method 300 proceeds to procedure block 312.

At procedure block 312, a fish measurement engine 222 of the underwater camera system 106 determines at least one dimension of the fish based on the image and the segmentation mask, and at block 314, the fish measurement engine 222 determines a weight of the fish by using the at least one dimension of the fish to query a fish weight data store 216 of the underwater camera system 106. In some embodiments, all of the fish within the fish pen 104 may be the same, and so the fish weight data store 216 may be queried without having to separately determine the species of fish. In some embodiments, fish of multiple different species may be present in the fish pen 104, and so an additional step of determining a species of the fish (such as providing the segmentation mask to another machine learning model stored in the machine learning model data store 218) may be performed in order to obtain the species of the depicted fish for the query.

Figure 6:
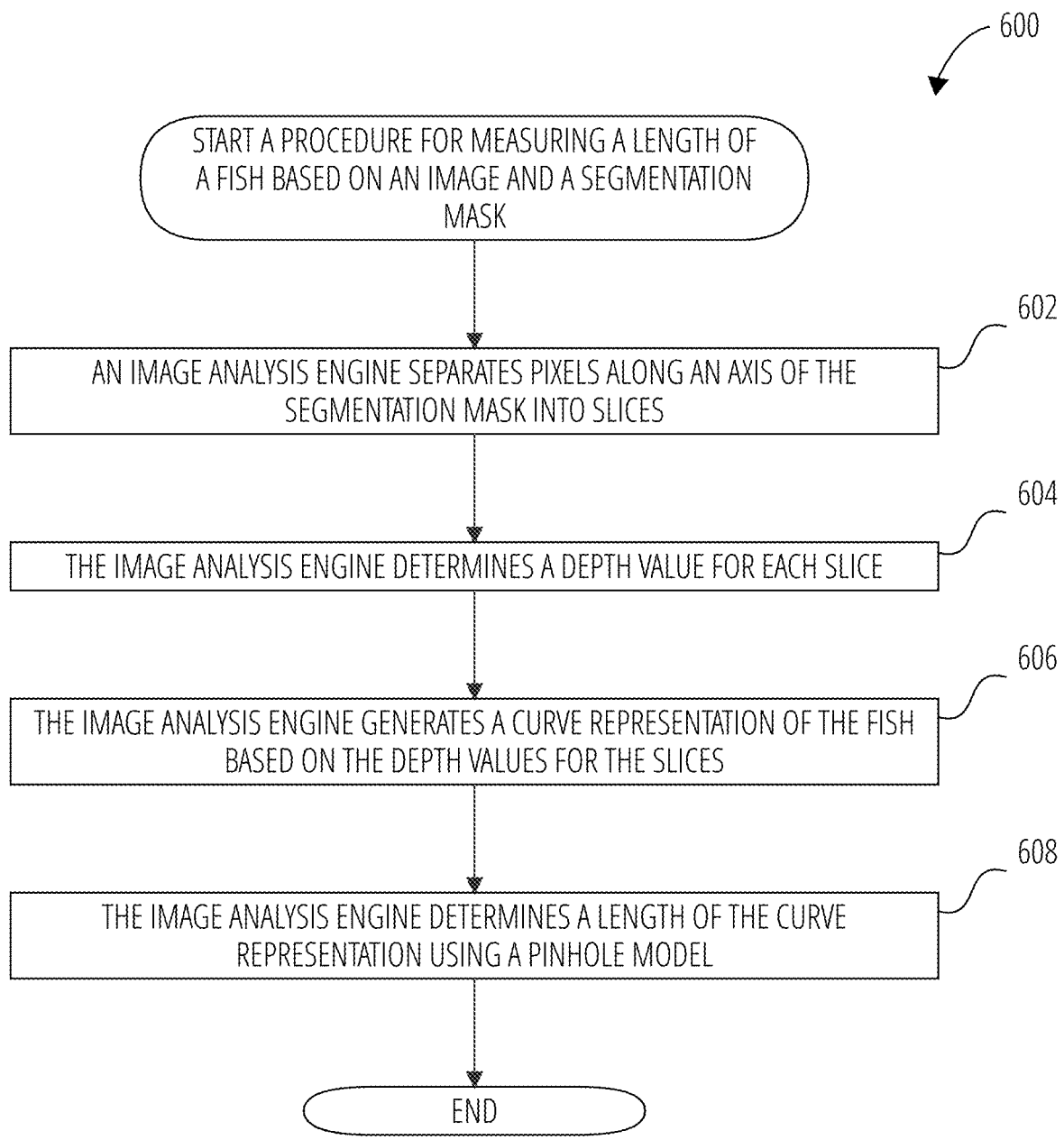
FIG. 6 is a flowchart that illustrates a non-limiting example embodiment of a procedure for measuring a length of a fish based on an image and a segmentation mask according to various aspects of the present disclosure

The method 300 may determine any dimension (or dimensions) that can be used to query the fish weight data store 216 for a fish weight. For example, data is available (and may be stored in the fish weight data store 216) that correlates a length and/or a height of a fish of a given species with a weight. Accordingly, by using a length and/or height of a fish determined at procedure block 312 to query the fish weight data store 216, the weight of a fish may be determined. Any suitable technique for obtaining at least one dimension of the fish based on the image and the segmentation mask may be used. One non-limiting example of such a technique is illustrated in FIG. 6 and discussed in further detail below.

At block 316, the fish measurement engine 222 adds the weight of the fish to a fish measurement data store 214 of the underwater camera system 106. In some embodiments, the fish measurement engine 222 may also store the measured dimensions of the fish to the fish measurement data store 214.

The method 300 then proceeds to decision block 318, where a decision is made regarding whether enough measurements of fish have been added to the fish measurement data store 214. In some embodiments, the total number of measurements of fish added to the fish measurement data store 214 may be compared to a threshold number of measurements. In some embodiments, a confidence interval may be configured, and the confidence interval may be used to determine the threshold number of measurements. For example, if it is known that the fish pen 104 contains 40,000 fish, configuring the underwater camera system 106 to use a 95% confidence interval would mean that about 381 fish measurements should be collected to ensure that the true mean weight of all the fish in the pen is within 5% of the mean of the sample.

If more measurements are needed to constitute a statistically adequate sample of the fish in the fish pen 104, then the result of decision block 318 is NO, and the method 300 returns to block 302 to capture another image of a fish. Otherwise, if enough measurements have been stored in the fish measurement data store 214, then the result of decision block 318 is YES, and the method 300 advances to block 320.

At block 320, the fish measurement engine 222 uses the weights stored in the fish measurement data store 214 to determine a fish biomass. In some embodiments, the fish measurement engine 222 may determine a mean of the stored fish measurements, and may multiply that mean by the population of fish in the fish pen 104 in order to determine the total fish biomass. In some embodiments, the fish measurement engine 222 may determine the population of fish in the fish pen 104 based on an initial number of fish that were counted as being added to the fish pen 104, minus a mortality count that reflects a count of fish that were known to have died off, and minus an estimated shrinkage count that reflects a count of fish that were removed from the fish pen 104 by undetected means (including but not limited to external predation). In some embodiments, the fish measurement engine 222 may use the mean of the stored fish measurements itself as the determined fish biomass.

The method 300 then proceeds to an end block and terminates. Though FIG. 3 illustrates the method 300 as stopping at this point, in some embodiments, the method 300 may continue to use the determined total fish biomass for any purpose. For example, in some embodiments, the fish measurement engine 222 may transmit the total fish biomass to the aquaculture management computing device 102, which may then present the total fish biomass to a user. In some embodiments, the fish measurement engine 222 may transmit the total fish biomass to the aquaculture management computing device 102, which may then use the total fish biomass to control an automated feeding device. As another example, the fish measurement engine 222 may transmit the mean of the stored fish measurements to be used for similar purposes.

In some embodiments, the aquaculture management computing device 102 may measure the rate of change of the fish biomass over time, and the rate of change may be used to control the fish feeding device. In some embodiments, the biomass estimation and the trend on growth rates may be used to select a feed pellet size and/or a type of feed for the population within the fish pen 104. The biomass estimation and the trend on growth rates may also be used to set a total feed amount, feed delivery style, feed rate, and/or feed time. In some embodiments, the biomass estimate and/or the rate of change of the total fish biomass over time may be an input to a feedback loop mechanism for controlling automated feeding devices. Other input to the feedback loop mechanism may include one or more of a set of environmental data such as water temperature and water pressure (distance beneath the surface). The output of the feedback loop mechanism may indicate a go/no go for feed delivery on a given day.

FIG. 4 is a flowchart that illustrates a non-limiting example embodiment of a procedure for determining measurability of a fish associated with a segmentation mask in an image according to various aspects of the present disclosure. The procedure 400 is a non-limiting example of a procedure suitable for use at procedure block 308 of FIG. 3. In general, the procedure 400 provides an image quality estimation pipeline that allows images that are likely to lead to inaccurate fish weight estimates to be ignored. In some embodiments, the procedure 400 operates on a cropped portion of an image determined by the image analysis engine 220 to contain a fish as discussed above. In some embodiments, the procedure 400 may also receive the segmentation mask information that indicates the pixels of the image that are associated with the fish to be analyzed. As discussed above, because the image is captured by the stereoscopic camera 202, the image includes both color information and depth information for each pixel.

From a start block, the procedure 400 advances to block 402, where an image analysis engine 220 determines an amount of blur associated with the image of the fish. Blur may be detected using any suitable technique, including but not limited to determining variation of the Laplacian, computing a Fast Fourier Transform and examining the distribution of high and low frequencies, using machine learning models trained on blurry and non-blurry images, or any other suitable technique.

The procedure 400 then advances to decision block 404, where a decision is made based on the amount of blur determined by the image analysis engine 220. In some embodiments, the decision may be made by comparing the amount of blur to a predetermined threshold amount of blur that depends on the blur detection technique that was used.

If the comparison of the amount of blur to the predetermined threshold amount of blur indicates that the image of the fish is too blurry, then the result of decision block 404 is YES, and the procedure 400 advances to block 418. Otherwise, if the comparison of the amount of blur to the predetermined threshold amount of blur does not indicate that the image of the fish is too blurry, then the result of decision block 404 is NO, and the procedure 400 advances to block 406.

At block 406, the image analysis engine 220 processes the segmentation mask using a shape analysis filter. In some embodiments, the shape analysis filter is trained to extract features from the shape of the segmentation mask, and to compare those features to features extracted from a training set of known-good segmentation masks. In some embodiments, a set of Zernike moments may be determined for the segmentation mask. The Zernike moments include features that are orthogonal to each other, thereby minimizing the redundancy of information. Features based on Zernike moments are also translation and scale invariant, thus providing strict shape matching criteria. In some embodiments, the segmentation mask may be standardized to remove scale or translation invariance by rotating, tight cropping, and/or resizing the segmentation mask to fixed dimensions before extracting the features.

The procedure 400 then advances to decision block 408, where a decision is made based on whether or not the shape analysis filter determined that the features extracted from the segmentation mask are sufficiently similar to the features extracted from the known-good segmentation masks. If the shape analysis filter determined that the segmentation mask is not similar enough, then the result of decision block 408 is YES, and the procedure 400 advances to block 418. Otherwise, if the shape analysis filter determined that the segmentation mask does have a shape that is similar to the known-good segmentation mask shapes, then the result of decision block 408 is NO, and the procedure 400 advances to block 410.

Figure 5:
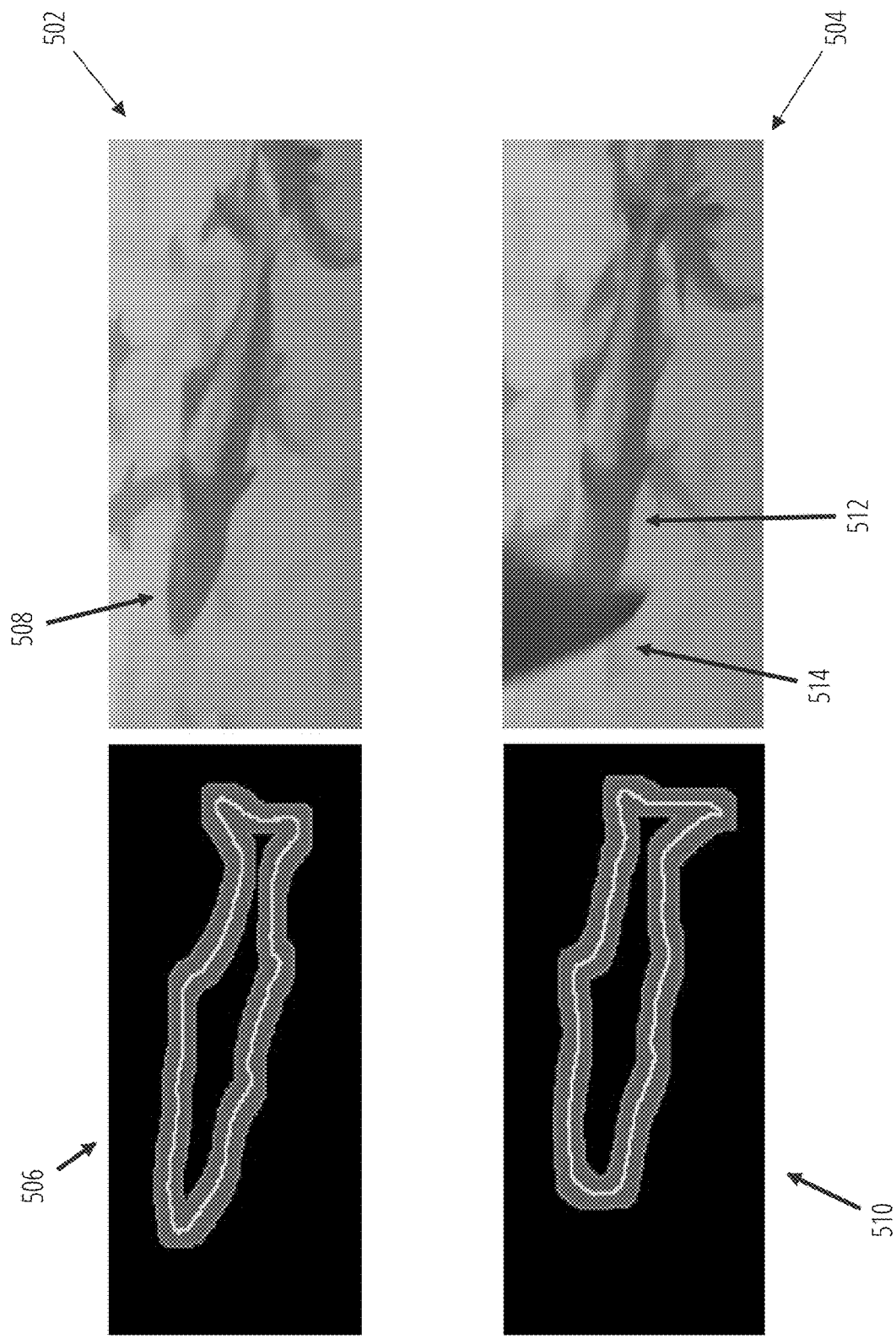
FIG. 5 is an image that illustrates a non-limiting example embodiment of an occluded segmentation mask and image, as well as a non-limiting example embodiment of a non-occluded segmentation mask and image, according to various aspects of the present disclosure.

One common problem in using a camera to monitor fish in a fish pen 104 is that, as the fish grow and begin to crowd the fish pen 104, it is increasingly common for a view of one fish to be occluded by another fish. FIG. 5 is an image that illustrates a non-limiting example embodiment of an occluded segmentation mask and image, as well as a non-limiting example embodiment of a non-occluded segmentation mask and image, according to various aspects of the present disclosure. In a first image 502, a non-occluded fish 508 is visible to the camera in its entire length. Accordingly, the corresponding non-occluded segmentation mask 506 shows the entire non-occluded fish 508. In a second image 504, a portion of an occluded fish 512 is visible to the camera, but an occluding fish 514 that is closer to the camera has a fin that is covering a front portion of the occluded fish 512. Accordingly, in the corresponding occluded segmentation mask 510 is truncated at the front portion of the occluded fish 512. That said, the shape of the occluded segmentation mask 510 is still fish-like, so it is possible that despite the occlusion, the shape analysis filter applied at block 406 may not have determined that the second image 504 is not measurable. Additional analysis should be performed in order to detect occlusions in the image that render the segmentation mask unsuitable for measurement.

To that end, returning to block 410 of FIG. 4, the image analysis engine 220 determines an average depth of pixels in a region inside the segmentation mask, and at block 412, the image analysis engine 220 compares depths of pixels in a region outside the segmentation mask to the average depth of pixels in the region inside the segmentation mask. As shown in FIG. 5, the image analysis engine 220 may determine an average depth of pixels in a region a predetermined number of pixels outside the border of the segmentation mask, and may determine an average depth of pixels in a region a predetermined number of pixels inside the border of the segmentation mask (or within the entire segmentation mask). In some embodiments, the image analysis engine 220 may first partition the segmentation mask into slices (e.g., into vertical, horizontal, or radial slices), and may determine the average depths of pixels inside and outside of the border of the segmentation mask within each slice separately. The image analysis engine 220 then compares the average depth of the pixels in the outer portion to the average depth of the pixels in the inner portion. If the fish is not occluded, then the average depth of the pixels in the outer portion (or in the outer portion for every slice) will be greater than the average depth of the pixels in the inner portion. However, if the fish is occluded, then the average depth of the pixels in the outer portion (or in the outer portion for at least one slice) will be greater than the average depth of the pixels in the inner portion, signifying that there is an object closer to the camera than the fish. In FIG. 5, all of the pixels surrounding the segmentation mask for the non-occluded fish 508 in the first image 502 would have a greater depth than the pixels within the segmentation mask, whereas the pixels surrounding the segmentation mask for the occluded fish 512 in a slice of the front portion of the occluded fish 512 would have a lesser depth than the pixels within the segmentation mask, thus indicating the presence of the occluding fish 514.

The procedure 400 then advances to decision block 414, where the comparison performed in block 412 is used to determine whether the object identified by the segmentation mask is occluded. If the comparison indicates that the object is occluded, then the result of decision block 414 is YES, and the procedure 400 advances to block 418. Block 418 is the target of each decision block result that indicates that the image of the fish is not appropriate for measurement. Accordingly, at block 418, the image analysis engine 220 determines that the fish is not measurable. The procedure 400 then advances to the end block and terminates.

Returning to decision block 414, if the comparison indicates that the object is not occluded, then the result of decision block 414 is NO, and the procedure 400 advances to block 416. At block 416, all of the tests on the image of the fish have been performed and none of the tests have indicated that the fish in the image is not measurable. Accordingly, at block 416, the image analysis engine 220 determines that the fish is measurable. The procedure 400 then advances to an end block and terminates.

Upon termination, the procedure 400 provides its determination of whether or not the fish is measurable to its caller.

FIG. 6 is a flowchart that illustrates a non-limiting example embodiment of a procedure for measuring a length of a fish based on an image and a segmentation mask according to various aspects of the present disclosure. The procedure 600 is an example of a technique suitable for use at procedure block 312 of FIG. 3, wherein length is the at least one dimension to be determined.

From a start block, the procedure 600 advances to block 602, where an image analysis engine 220 separates pixels along an axis of the segmentation mask into slices. For example, the image analysis engine 220 may separate the segmentation mask into slices that are a given number of pixels wide. The number of pixels may be configurable in order to manage trade-offs between speed of computation and fine-grained accuracy. As a non-limiting example, in some embodiments the image analysis engine 220 may separate the segmentation mask into slices that are ten pixels wide, though any other suitable number of pixels may be used.

At block 604, the image analysis engine 220 determines a depth value for each slice. In some embodiments, the image analysis engine 220 may determine a mean depth of the pixels within each slice, and may use the mean depth as the depth of the slice. In some embodiments, the image analysis engine 220 may determine a depth of a pixel at a midpoint of each slice, and may use the depth of the midpoint pixel as the depth of the slice. In some embodiments, the image analysis engine 220 may determine a depth of pixels at each border of each slice.

At block 606, the image analysis engine 220 generates a curve representation of the fish based on the depth values for the slices. That is, in some embodiments, the image analysis engine 220 may determine locations for each of the slices in three-dimensional space with respect to the camera.

At block 608, the image analysis engine 220 determines a length of the curve representation using a pinhole model. That is, the image and the depth values may be processed as if the camera that captured the image were a pinhole camera, and the image analysis engine 220 may use the distances of each slice from the camera, along with the horizontal width of each slice, in order to compute the actual length in three-dimensional space of the curve representation of the fish. In some embodiments, the image analysis engine 220 may also compensate for underwater refraction as part of its pinhole model.

The procedure 600 then advances to an end block and terminates. Upon termination, the procedure 400 provides its determination of the length of the fish to its caller. One will understand that similar techniques could be used to determine a height of a fish by simply reorienting the process in a vertical direction instead of a horizontal one.

Figure 7:
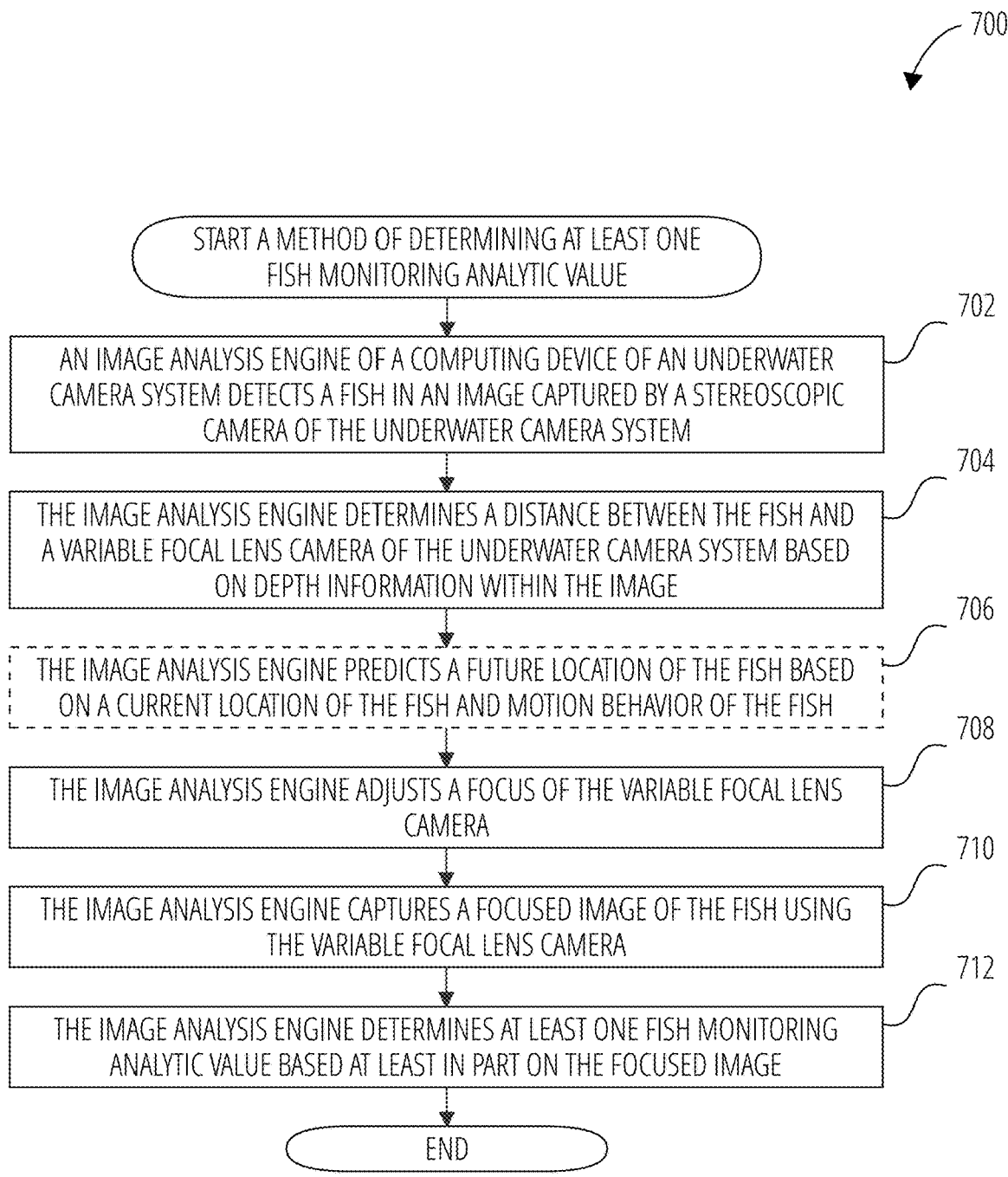
FIG. 7 is a flowchart that illustrates a non-limiting example embodiment of a method of determining at least one fish monitoring analytic value according to various aspects of the present disclosure.

FIG. 7 is a flowchart that illustrates a non-limiting example embodiment of a method of determining at least one fish monitoring analytic value according to various aspects of the present disclosure. In addition to measuring dimensions of fish and using the dimensions to determine fish weight and biomass totals, the high-quality images captured by the underwater camera system 106 provide the capability to determine other analytic values for management of the fish pen 104.

From a start block, the method 700 proceeds to block 702, where an image analysis engine 220 of a computing device 206 of an underwater camera system 106 detects a fish in an image captured by a stereoscopic camera 202 of the underwater camera system 106. In some embodiments, the image analysis engine 220 may use a machine learning model stored in the machine learning model data store 218, including but not limited to a convolutional neural network, to detect the fish in the image. As above, the image captured by the stereoscopic camera 202 may include both color information and depth information for each pixel. In some embodiments, the method 700 may use a technique such as procedure 400 to determine whether the at least one image is appropriate for analysis, though such steps are not illustrated in FIG. 7.

At block 704, the image analysis engine 220 determines a distance between the fish and a variable focal lens camera 204 of the underwater camera system 106 based on depth information within the image. In some embodiments, the image analysis engine 220 is aware of a relative position of the stereoscopic camera 202 and the variable focal lens camera 204, and uses this relative position along with the depth information within the image (that represents a distance between the stereoscopic camera 202 and the fish) to determine the distance between the fish and the variable focal lens camera 204. In some embodiments, the variable focal lens camera 204 is positioned in a way, including but not limited to between the lenses of the stereoscopic camera 202, such that the depth information within the image can be used as the distance between the variable focal lens camera 204 and the fish without further processing.

At optional block 706, the image analysis engine 220 predicts a future location of the fish based on a current location of the fish and motion behavior of the fish. In some embodiments, the image analysis engine 220 may use indications of motion and/or orientation of the fish either in the image or in multiple consecutive images of the fish in order to determine the motion and/or orientation of the fish. This block is illustrated and described as optional because in some embodiments, a single image of a slow-moving fish may be analyzed, and the predicted motion of the fish may be immaterial for the analysis.

At block 708, the image analysis engine 220 adjusts a focus of the variable focal lens camera 204. In some embodiments, the image analysis engine 220 may adjust the focus of the variable focal lens camera 204 to match the depth information (or the processed depth information) from block 704. In some embodiments, the image analysis engine 220 may adjust the focus of the variable focal lens camera 204 to follow the predicted motion of the fish. In some such embodiments, the image analysis engine 220 may continually measure the depth information from the stereoscopic camera 202 and continually adjust the focus of the variable focal lens camera 204 based on the predicted motion of the fish. In some embodiments, the predicted motion of the fish may include one or more of a vector representing the fish motion, an orientation of the fish, and a body movement of the fish.

At block 710, the image analysis engine 220 captures a focused image of the fish using the variable focal lens camera 204, and at block 712, the image analysis engine 220 determines at least one fish monitoring analytic value based at least in part on the focused image. Because the focus of the variable focal lens camera 204 has been adjusted to capture the focused image of the fish, a high-resolution view of the fish can be obtained from which detailed analysis of the condition of the fish can be determined.

One example of a fish monitoring analytic value that can be determined based on the focused image and the predicted motion is the presence or absence of a skin condition, sea lice, or amoebal gill disease. Because focusing the variable focal lens camera 204 on the fish allows a high-resolution image of the skin of the fish to be captured, these conditions can be identified on the fish from the focused image using any suitable technique, including but not limited to a machine learning model trained to detect sea lice, skin conditions, or signs of amoebal gill disease.

The method 700 then proceeds to an end block and terminates. Though FIG. 7 illustrates the method 700 as terminating at this point, in some embodiments, the fish monitoring analytic value may be used to control operation of the fish pen 104. For example, in some embodiments, the fish monitoring analytic value may be transmitted to the aquaculture management computing device 102 for presentation to a user so that the user may take action. As another example, in some embodiments, the fish monitoring analytic value may be used by the aquaculture management computing device 102 to automatically control a function of the fish pen 104. For example, if sea lice are detected, a treatment for sea lice, such as dispensing of H2O2, providing an additive to feed to prevent the sea lice, or introduction of other fish that eat the sea lice, may be provided.

Figure 8:
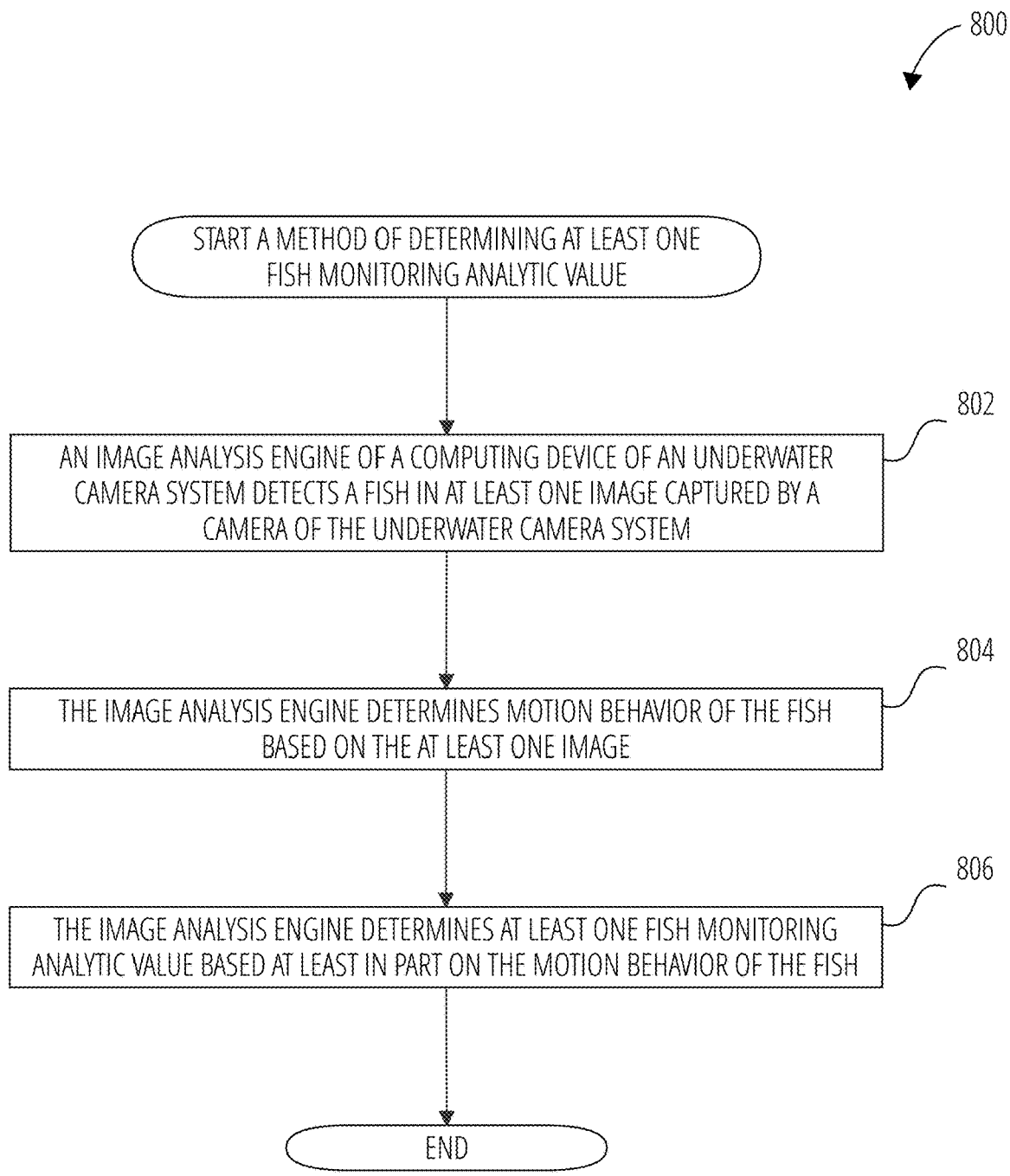
FIG. 8 is a flowchart that illustrates a non-limiting example embodiment of a method of determining at least one fish monitoring analytic value according to various aspects of the present disclosure.

FIG. 8 is a flowchart that illustrates a non-limiting example embodiment of a method of determining at least one fish monitoring analytic value according to various aspects of the present disclosure. Some fish monitoring analytic values can be determined based on the motion behavior of the fish, even if a focused image is not obtained.

From a start block, the method 800 proceeds to block 802, where an image analysis engine 220 of a computing device 206 of an underwater camera system 106 detects a fish in at least one image captured by a camera of the underwater camera system 106. In some embodiments, the image analysis engine 220 may use a machine learning model stored in the machine learning model data store 218, including but not limited to a convolutional neural network, to detect the fish in the image. The image analysis engine 220 may use one or more images captured by a stereoscopic camera 202 or a variable focal lens camera 204. In some embodiments, the method 800 may use a technique such as procedure 400 to determine whether the at least one image is appropriate for analysis, though such steps are not illustrated in FIG. 8.

At block 804, the image analysis engine 220 determines motion behavior of the fish. The motion behavior may include a vector and/or an orientation of the fish. In some embodiments, the image analysis engine 220 may use indications of motion and/or orientation of the fish either in the image or in multiple consecutive images of the fish in order to determine the motion and/or orientation of the fish.

At block 806, the image analysis engine 220 determines at least one fish monitoring analytic value based at least in part on the motion behavior of the fish.

One example of a fish monitoring analytic value that can be determined based on the motion behavior is the presence or absence of trematode infection. In some species of fish, trematode infection will cause the fish to change orientation while swimming to rub against structures of the fish pen 104 such as netting or ropes, and may cause the fish to swim upside down. Detecting the inverted orientation of the fish and/or motion that brings the fish in contact with underwater structures can indicate the presence of trematode infection.

Another example of a fish monitoring analytic value that can be determined based on the motion behavior is stress in fish species that have a swim bladder, including but not limited to trout and steelhead. A deflated swim bladder may occur in cases where fish remain in a submerged state and are not able to come to the surface to refill their swim bladder with air to control buoyancy. The motion behavior can indicate the presence of such stress when the predicted motion shows that the fish is swimming sideways and/or showing signs of lethargy, as their buoyancy is no longer compensated by their swim bladder.

Still another example of a fish monitoring analytic value that can be determined based on the motion behavior is fish satiation. It has been observed that some fish species are known to change swim patterns and schooling patterns once they are satiated. Accordingly, the motion behavior can be compared to the known swim patterns and schooling patterns that indicate satiation in order to determine satiation as a fish monitoring analytic value.

The method 800 then proceeds to an end block and terminates. Though FIG. 8 illustrates the method 800 as terminating at this point, in some embodiments, the fish monitoring analytic value may be used to control operation of the fish pen 104. For example, in some embodiments, the fish monitoring analytic value may be transmitted to the aquaculture management computing device 102 for presentation to a user so that the user may take action. As another example, in some embodiments, the fish monitoring analytic value may be used by the aquaculture management computing device 102 to automatically control a function of the fish pen 104. For example, if trematode infection is detected, a $H_2O_2$ dispenser may be activated to bathe the fish pen 104 with a diluted concentration of $H_2O_2$ for an effective amount of time to address the infection, such as a few seconds or minutes. As another example, if swim bladder related stress is detected, a submersible fish pen 104 may be brought to the surface to allow the fish to recharge their bladders, or functionality of an artificial air bubble provided while the fish pen 104 is submerged may be verified or activated. As a final example, the presence or absence of a detection of satiation may be used to control a feed dispenser.

Figure 9:
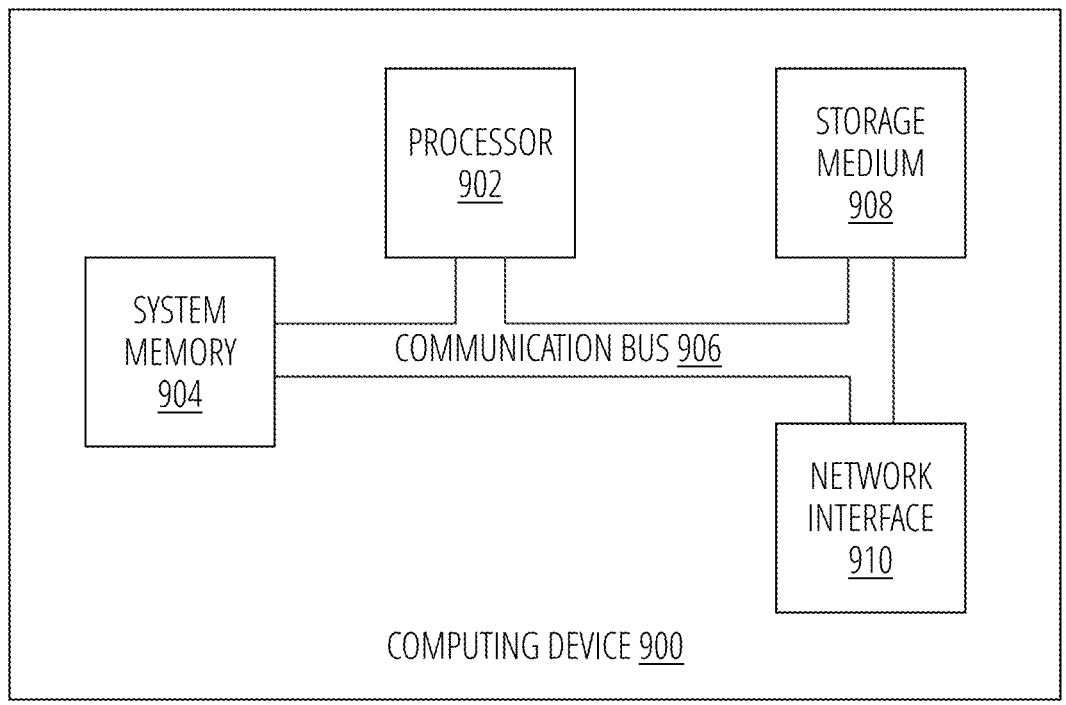
FIG. 9 is a block diagram that illustrates a non-limiting example embodiment of a computing device appropriate for use as a computing device with embodiments of the present disclosure.

FIG. 9 is a block diagram that illustrates aspects of an exemplary computing device 900 appropriate for use as a computing device of the present disclosure. While multiple different types of computing devices were discussed above, the exemplary computing device 900 describes various elements that are common to many different types of computing devices. While FIG. 9 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Some embodiments of a computing device may be implemented in or may include an application-specific integrated circuit (ASIC), a field-programmable gate array (FPGA), or other customized device. Moreover, those of ordinary skill in the art and others will recognize that the computing device 900 may be any one of any number of currently available or yet to be developed devices.

In its most basic configuration, the computing device 900 includes at least one processor 902 and a system memory 904 connected by a communication bus 906. Depending on the exact configuration and type of device, the system memory 904 may be volatile or nonvolatile memory, such as read only memory ("ROM"), random access memory ("RAM"), EEPROM, flash memory, or similar memory technology. Those of ordinary skill in the art and others will recognize that system memory 904 typically stores data and/or program modules that are immediately accessible to and/or currently being operated on by the processor 902. In this regard, the processor 902 may serve as a computational center of the computing device 900 by supporting the execution of instructions.

As further illustrated in FIG. 9, the computing device 900 may include a network interface 910 comprising one or more components for communicating with other devices over a network. Embodiments of the present disclosure may access basic services that utilize the network interface 910 to perform communications using common network protocols. The network interface 910 may also include a wireless network interface configured to communicate via one or more wireless communication protocols, such as Wi-Fi, 2G, 3G, LTE, WiMAX, Bluetooth, Bluetooth low energy, and/or the like. As will be appreciated by one of ordinary skill in the art, the network interface 910 illustrated in FIG. 9 may represent one or more wireless interfaces or physical communication interfaces described and illustrated above with respect to particular components of the computing device 900.

In the exemplary embodiment depicted in FIG. 9, the computing device 900 also includes a storage medium 908. However, services may be accessed using a computing device that does not include means for persisting data to a local storage medium. Therefore, the storage medium 908 depicted in FIG. 9 is represented with a dashed line to indicate that the storage medium 908 is optional. In any event, the storage medium 908 may be volatile or nonvolatile, removable or nonremovable, implemented using any technology capable of storing information such as, but not limited to, a hard drive, solid state drive, CD ROM, DVD, or other disk storage, magnetic cassettes, magnetic tape, magnetic disk storage, and/or the like.

Suitable implementations of computing devices that include a processor 902, system memory 904, communication bus 906, storage medium 908, and network interface 910 are known and commercially available. For ease of illustration and because it is not important for an understanding of the claimed subject matter, FIG. 9 does not show some of the typical components of many computing devices. In this regard, the computing device 900 may include input devices, such as a keyboard, keypad, mouse, microphone, touch input device, touch screen, tablet, and/or the like. Such input devices may be coupled to the computing device 900 by wired or wireless connections including RF, infrared, serial, parallel, Bluetooth, Bluetooth low energy, USB, or other suitable connections protocols using wireless or physical connections. Similarly, the computing device 900 may also include output devices such as a display, speakers, printer, etc. Since these devices are well known in the art, they are not illustrated or described further herein.

What is claimed is:

1. A computer-implemented method of determining biomass in a fish pen, the computer-implemented method comprising:

detecting, by a computing device, a location of a fish in an image captured by an underwater stereoscopic camera;

determining, by the computing device, a segmentation mask for the fish in the image;

determining, by the computing device, an average depth of pixels in a first region of the image corresponding to the segmentation mask;

comparing, by the computing device, the average depth of pixels in the first region to depths of pixels in a second region outside of the segmentation mask in the image;

determining, by the computing device and based at least in part on the comparing, that the fish is measurable; and in response to determining that the fish is measurable:

determining, by the computing device, at least one dimension of the fish based on the image;

determining, by the computing device, a weight of the fish based on the at least one dimension of the fish; and adding, by the computing device, the weight of the fish to a set of fish weight measurements.

2. The computer-implemented method of claim 1, further comprising:

determining, by the computing device, that the set of fish weight measurements includes at least a threshold number of fish weight measurements; and in response to determining that the set of fish weight measurements includes at least the threshold number of fish weight measurements:

determining, by the computing device, a total fish biomass in the fish pen based on the set of fish weight measurements.

3. The computer-implemented method of claim 2, wherein determining the set of fish weight measurements includes at least the threshold number of fish weight measurements comprises determining whether the set of fish weight measurements includes a number of fish weight measurements to provide a predetermined confidence that a true mean weight of the set of fish weight measurements is within a predetermined threshold of a mean weight of the set of fish weight measurements.

4. The computer-implemented method of claim 1, wherein determining the fish is measurable further comprises applying at least one of:

a blur detection filter; and a shape measurement filter.

5. The computer-implemented method of claim 1, wherein determining the at least one dimension of the fish based on the image comprises:

separating pixels along an axis of the segmentation mask into slices;

determining a depth value of each slice of the slices; and determining a length of the segmentation mask in 3D presentation using a pinhole model on the image.

6. The computer-implemented method of claim 5, wherein determining the length of the segmentation mask in 3D presentation further comprises correcting depth data in the image to compensate for underwater refraction.

7. An underwater camera system for monitoring at least one fish in a fish pen, the underwater camera system comprising:
- a stereoscopic camera;
- a variable focal lens camera; and
- a computing device communicatively coupled to the variable focal lens camera and the stereoscopic camera, wherein the computing device is configured to:
  - continuously detect a fish in multiple consecutive images from the stereoscopic camera;
  - determine a vector representing a motion behavior of the fish from the multiple consecutive images;
  - continually adjust a focus of the variable focal lens camera based on the multiple consecutive images and the vector representing the motion behavior;
  - capture, after continually adjusting the focus of the variable focal lens camera, at least one focused image of the fish using the variable focal lens camera; and
  - determine at least one fish monitoring analytic value based at least in part on the at least one focused image.

8. The underwater camera system of claim 7, further comprising a housing, wherein the stereoscopic camera, the variable focal lens camera, and the computing device are positioned within or attached to the housing.

9. The underwater camera system of claim 7, wherein determining the at least one fish monitoring analytic value includes at least one of:
- determining a presence or absence of trematode infection;
- determining a presence or absence of stress in fish species that have a swim bladder; and
- determining a presence or absence of satiation.

10. The underwater camera system of claim 7, wherein the computing device is further configured to determine whether the fish is measurable before determining the at least one fish monitoring analytic value, wherein determining whether the fish is measurable includes at least one of detecting blur in at least one image of the multiple consecutive images, applying a shape measurement analysis to at least one image of the multiple consecutive images, and detecting occlusion of the fish in at least one image of the multiple consecutive images.

11. The underwater camera system of claim 7, wherein continually adjusting the focus of the variable focal lens camera based on the multiple consecutive images from the stereoscopic camera includes:
- determining a distance from the variable focal lens camera to the fish based on depth information within the multiple consecutive images from the stereoscopic camera; and
- continually adjusting the focus of the variable focal lens camera based on the distance.

12. The underwater camera system of claim 7, wherein continuously adjusting the focus of the variable focal lens camera based on the multiple consecutive images from the stereoscopic camera includes:
- predicting a future location of the fish based on a current location and the vector representing the motion behavior of the fish; and
- continuously adjusting the focus of the variable focal lens camera based on the predicted future location.

13. The underwater camera system of claim 7, wherein determining the at least one fish monitoring analytic value based at least in part on the at least one focused image includes at least one of:
- detecting a skin condition for the fish;
- detecting a sign of amoebal gill disease for the fish; and
- detecting sea lice on the fish.

14. The underwater camera system of claim 7, wherein determining the at least one fish monitoring analytic value based at least in part on the at least one focused image includes:
- determining the at least one fish monitoring analytic value based on the motion behavior.

* * * * *